United States Patent

[11] 3,604,752

| | | | | |
|---|---|---|---|---|
| [72] | Inventor | Albert J. Macknick<br>North Chicago, Ill. | 3,238,584 3/1966 Lassen et al. ................. | 24/125 |
| [21] | Appl. No. | 858,423 | 3,259,435 7/1966 Jordan, Jr. ................... | 297/455 |
| [22] | Filed | Sept. 16, 1969 | Primary Examiner—Casmir A. Nunberg | |
| [45] | Patented | Sept. 14, 1971 | Attorney—Robert J. Leek, Jr. | |
| [73] | Assignee | United States Steel Corporation | | |

[54] SUPPORT MEMBER FOR A VEHICLE SEAT
13 Claims, 12 Drawing Figs.

[52] U.S. Cl. ..................................................... 297/455,
287/113
[51] Int. Cl. ..................................................... A47c 7/02,
F16b 7/00
[50] Field of Search............................................ 287/49, 53,
113; 211/182; 297/445, 455; 24/125, 81 CC

[56] References Cited
UNITED STATES PATENTS
2,106,724 2/1938 Cope............................. 24/125 UX ABSTRACT: A support member for a vehicle seat having a stationary member is disclosed. The support member has a support portion provided with a support torsion leg, opposed support cantilever legs projecting from the support torsion leg, and a second support cantilever leg connecting the support cantilever legs. One means of a first clamp means and a pivot means secures the support torsion leg to the stationary member. A spring portion of the support member has a spring torsion leg disposed adjacent one leg of the support torsion leg and the second support cantilever leg. Opposed spring cantilever legs project from the spring torsion leg and a spring connecting leg connects the spring cantilever legs. A second clamp means connects the spring torsion leg to the one leg.

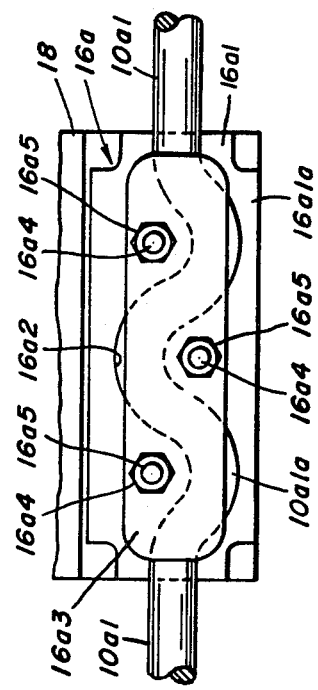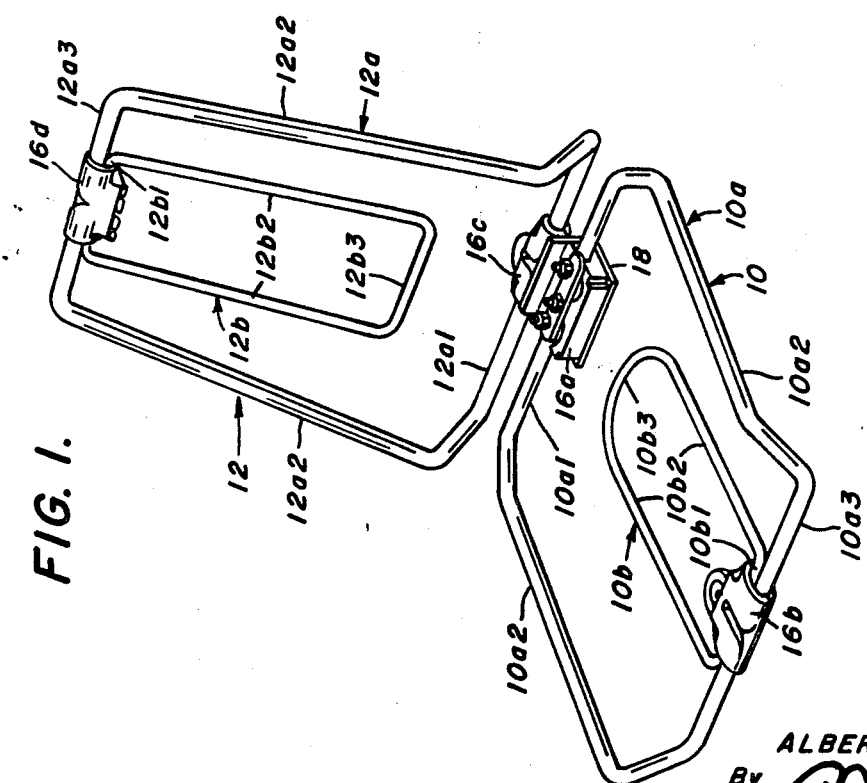

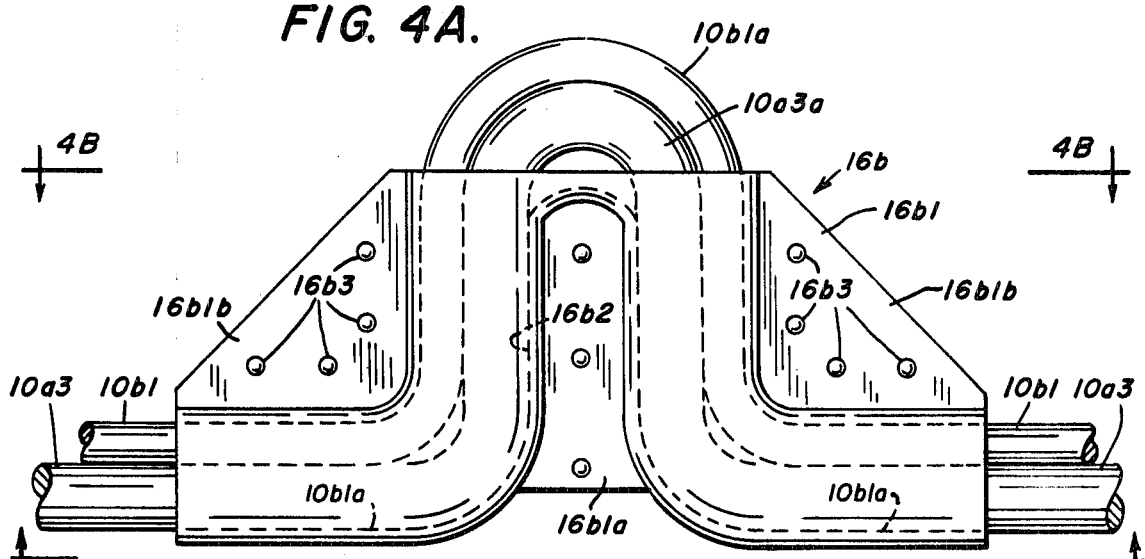
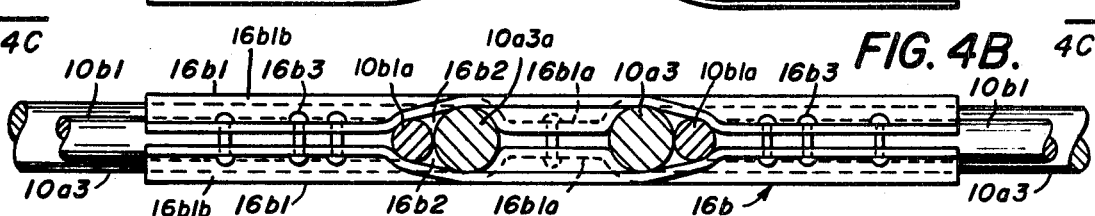
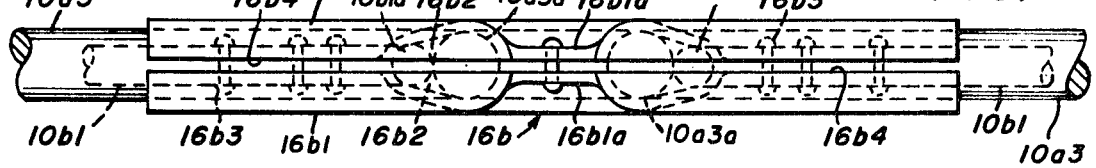
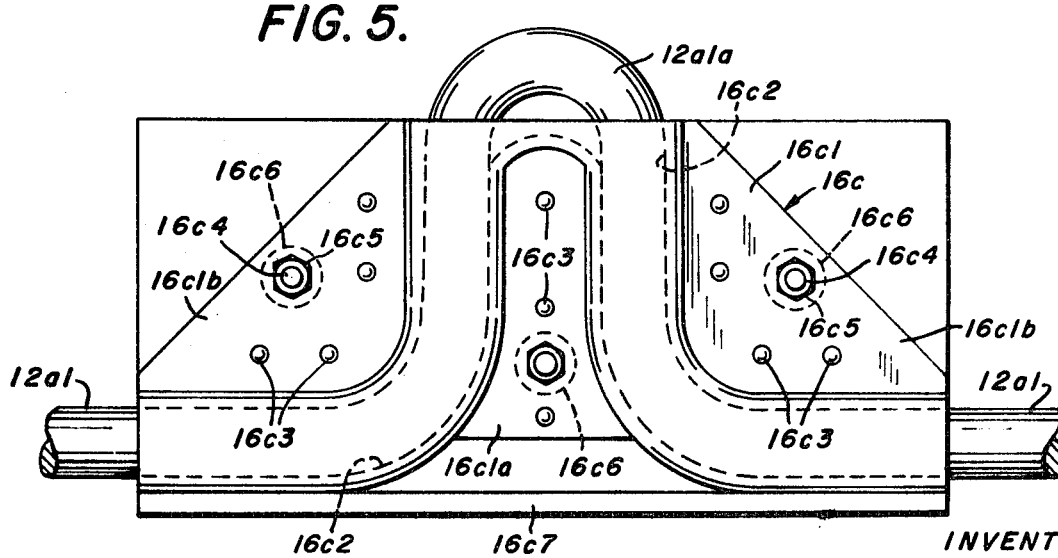

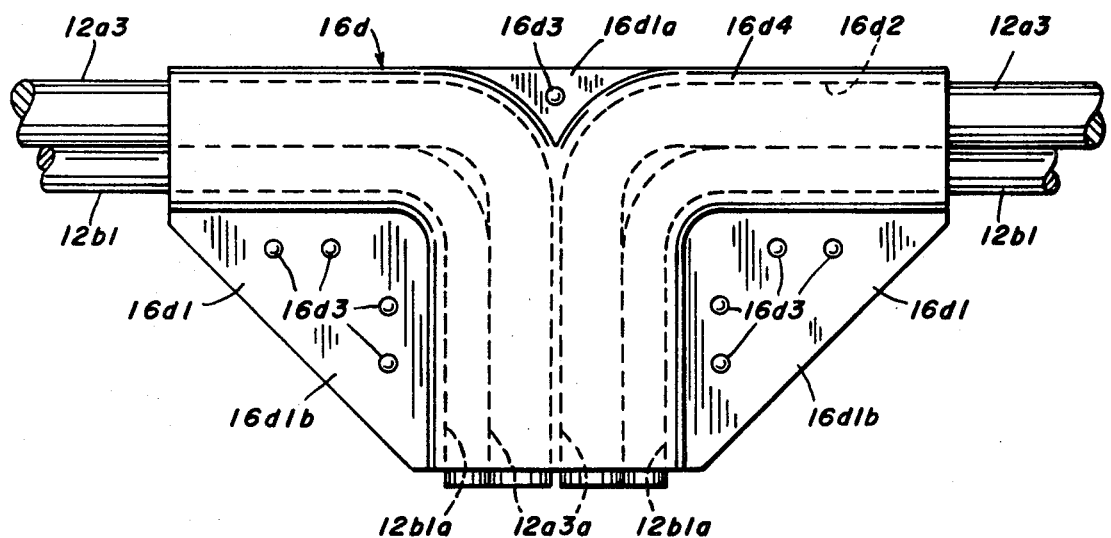
FIG. 6.
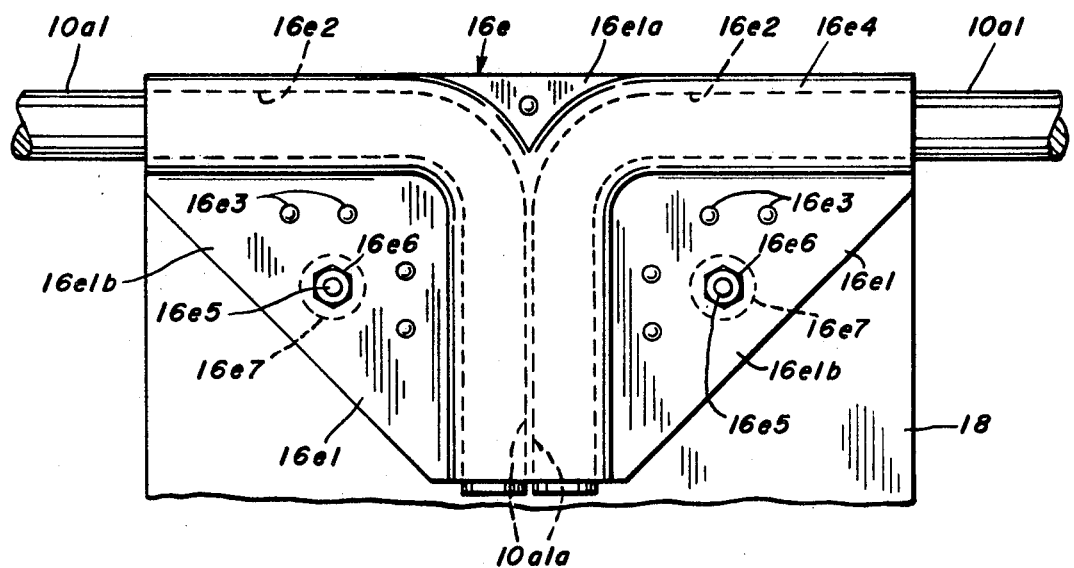
FIG. 8.
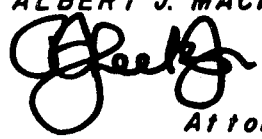

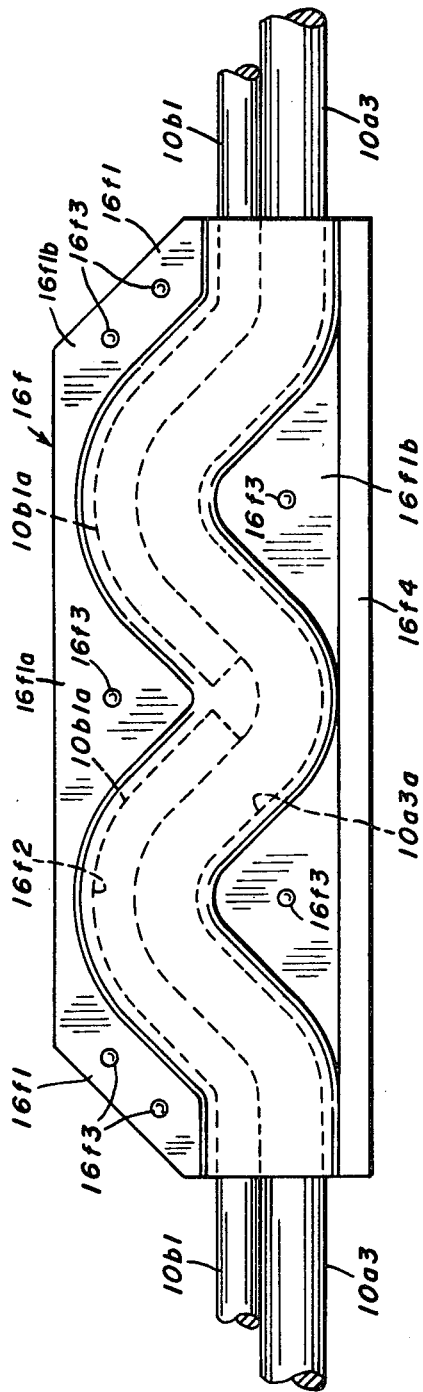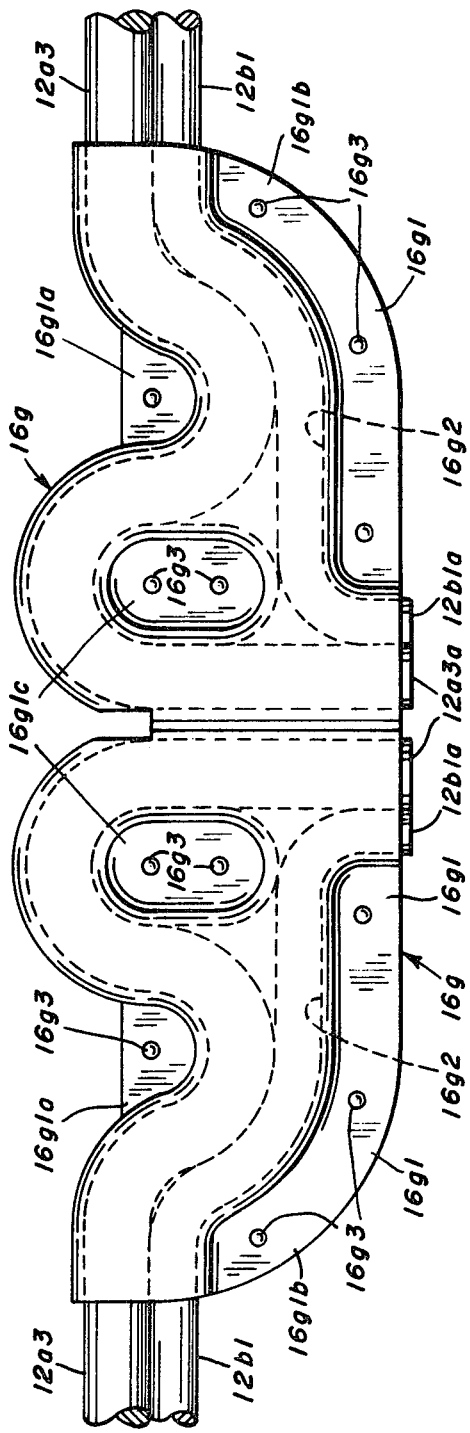

3,604,752

SUPPORT MEMBER FOR A VEHICLE SEAT

BACKGROUND OF THE INVENTION

Heretofore, a support member, such as a seat member or a backrest member, of a vehicle seat has been fabricated in the form shown in U.S. Pat. No. 3,259,435, issued July 5, 1966, to P. Jordan, Jr. In the construction of such seat member and backrest members shown in the Jordan patent, the spring members are connected to the support members by means of welding. Since the support members and spring members are formed of a high tensile strength, high carbon oil-tempered steel, the temperature required for the welding of these joints anneals portions of these support members and spring members adjacent the welds, thereby reducing the strength and resistance to fatigue of such support members and spring members in the area adjacent the welds.

Such conventional connectors are shown in the following patents:

| U.S. Pat. No. | Inventor | Issued |
|---|---|---|
| 526,123 | Poots et al. | 9/18/1894 |
| 631,284 | Ellison | 8/22/1899 |
| 778,773 | Brown et al. | 12/27/1904 |
| 833,082 | Perdue | 9/9/1906 |
| 2,169,111 | Rugg | 8/8/1939 |
| 3,259,435 | Jordan | 7/5/1966 |

OBJECTS OF THE INVENTION

It is the general object of this invention to avoid and overcome the foregoing and other difficulties of and objections to prior art practices by the provision of an improved support member for a vehicle seat which maintains the high tensile strength and resistance to fatigue in the component support portion and spring portion of the support member adjacent the areas of their connection or joint, prevents failure of such joint and provides a thin joint and a silouette with no sharp or massive projections, thus permitting facile application of foam material or padding about the joint.

BRIEF SUMMARY OF THE INVENTION

The aforesaid objects of this invention, and other objects which will become apparent as the description proceeds, are achieved by providing an improved support member for a vehicle seat having a stationary member. The improved support member has a support portion having a support torsion leg, opposed support cantilever legs projecting from the support torsion leg, and a second support cantilever leg connecting the support cantilever legs. One of a first clamp means and a pivot means secures the support torsion leg to the stationary member. A spring portion of the support member has a spring torsion leg disposed adjacent one leg of the support torsion leg and the second support cantilever leg. Opposed spring cantilever legs project from the spring torsion leg and a spring-connecting leg connects the spring cantilever legs. A second clamp means connects the spring torsion leg to the one leg.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIG. 1 is a perspective view of the support members for a vehicle seat with a fixed backrest;

FIG. 2 is an enlarged fragmentary side elevation view of the clamp between the support torsion leg of the seat support member and the frame;

FIG. 3 is a view taken along the line III—III of FIG. 2 in the direction of the arrows;

FIG. 4A is a fragmentary enlarged side elevational view of the clamp between the second support cantilever leg of the seat support member and the spring torsion leg of the seat spring member;

FIG. 4B is a top view taken along the lines IV B —IV B of FIG. 4A in the direction of the arrows;

FIG. 4C is a bottom view taken along the lines IV C IV C of FIG. 4A in the direction of the arrow;

FIG. 5 is a fragmentary enlarged plan view of the clamp between the support torsion leg of the backrest support member and the frame;

FIG. 6 is a fragmentary enlarged side elevational view of the clamp between the second support cantilever leg of the backrest support member and the spring torsion leg of the backrest spring portion;

FIG. 8 is a fragmentary enlarged plan view of an alternative clamp for clamping the generally J-shaped gripping portions of, for example, the support torsion leg of the support portion of the seat support member to the frame;

FIG. 9 is a plan view similar to FIG. 8 of an alternative clamp of the double S-type for joining, for example, the S-shaped gripping portions of the seat support member and of the second support cantilever leg of the support portion of the seat support member; and FIG. 10 is a view similar to FIG. 7 of a further alternative clamp for connecting the spring torsion leg of the spring portion of the backrest member to the second support cantilever leg of the support portion of the backrest member.

Figure 7:
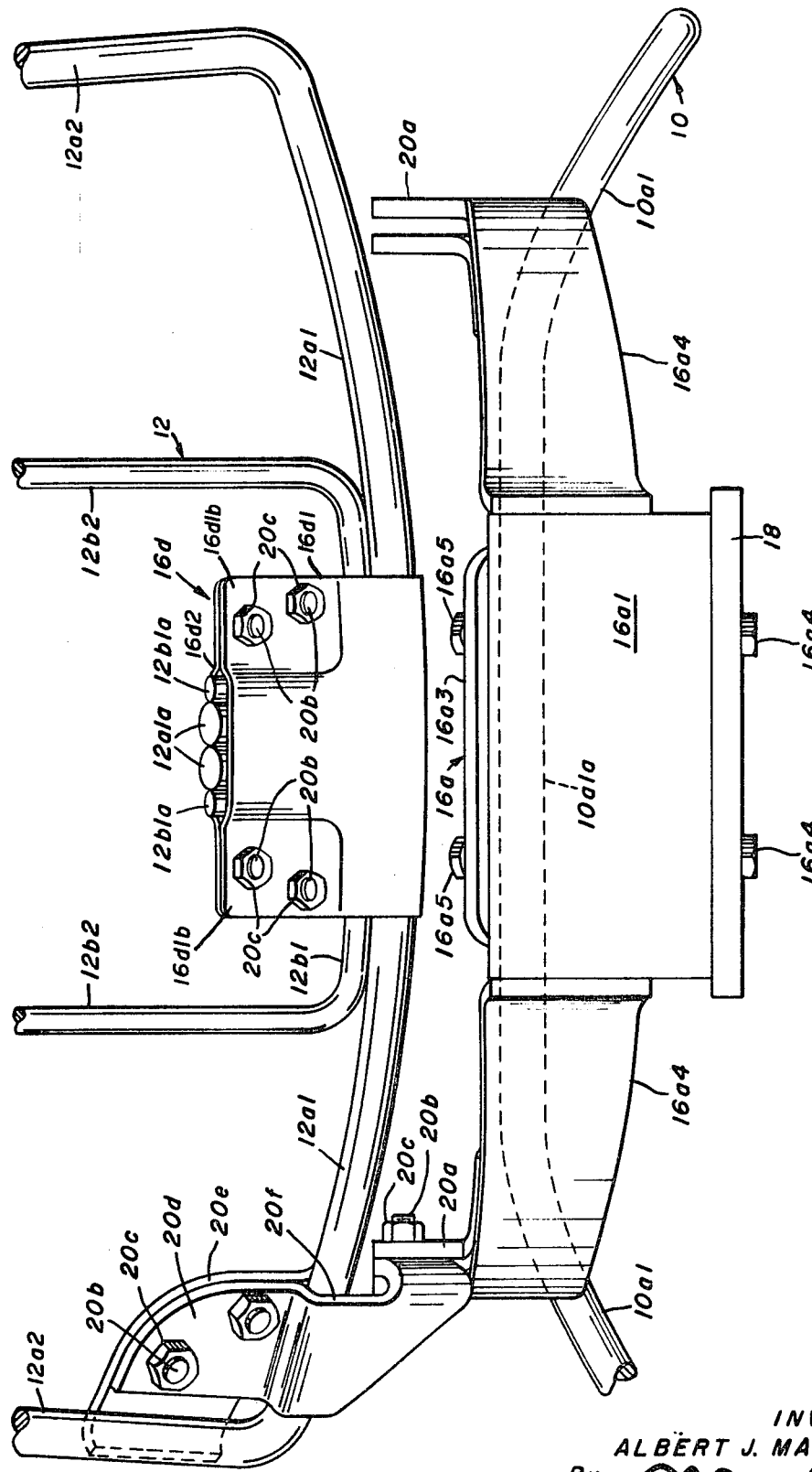
FIG. 7 is a fragmentary side elevational view of the lower portions of a backrest support member connected to the back portions of a seat support member by means of a pivot means, such as hinges, and showing the double J-type clamp of FIG. 6 connecting the support torsion leg of the backrest support member to the spring torsion leg of the backrest support member and the single S-type clamp of FIGS. 2, 3 for connecting the support torsion leg of the seat support member to the frame.

Although the principles of this invention are broadly applicable to vehicle seats, this invention is particularly adapted for use in conjunction with the support members for vehicle seats and hence it has been so illustrated and will be so described.

DETAILED DESCRIPTION

With specific reference to the form of this invention illustrated in The drawings, and referring particularly to FIG. 1, support members, such as seat support member and a backrest support member for a vehicle seat, are indicated generally by the reference numerals 10 and 10 respectively.

SEAT SUPPORT MEMBER 10

As shown in FIG. 1, the seat support member 10 for a vehicle seat has a stationary member, such as a frame (not shown) or in the case where the backrest support member 12 is hinged to the seat support member 10 (FIG. 7), the seat support member 10 functions as a stationary member (FIG. 7). The seat support member 10 (FIG. 1) has a support portion 10a having a support torsion leg 10a 1, (FIGS. 1-3,7,8) opposed support cantilever legs 10a 2 (FIG. 1) projecting from the support torsion leg 10a 1, and a second support cantilever leg 10a 3 (FIGS. 1, 4A-4C, 9) connecting the support cantilever legs 10a 2.

A first clamp means, such as the clamp 16a (FIGS. 1-3, 7), is mounted on an angle 18 (FIGS. 1-3, 7, 8) upstanding from the frame (not shown) for securing the support torsion leg 10a 1 to the frame (not shown).

A spring portion 10b of the seat support member 10 has a spring torsion leg 10 b 1, (FIGS. 1, 4A-4C, 9) disposed adjacent one leg of the support torsion leg 10a 1 and the second support cantilever leg 10a 3 (in this case the second support cantilever leg 10a 3 for connection thereto), opposed spring cantilever legs 10b 2 (FIG. 1) projecting from the spring torsion leg 10b 1, and a spring connecting leg 10b 3 (FIG. 1) connecting the spring cantilever legs 10b 2. A second clamp means, such as the clamp 16b (FIGS. 1, 4A–4C) connects the spring torsion leg 10b 1 to the second support cantilever leg 10a 3 (FIGS. 4A–4C).

BACKREST SUPPORT MEMBER 12

The backrest support member 12, shown in FIG. 1, has a support portion 12a provided with a support torsion leg 12a 1, (FIGS. 1, 5, 7) opposed support cantilever legs 12a 2 (FIG. 1, 7) projecting from the support torsion leg 12a 1, and a second support cantilever leg 12a 3 (FIGS. 1, 6, 10) connecting the support cantilever legs 12a 2.

A third clamp 16c (FIGS. 1, 5) mounted on the angle 18 secures the support torsion leg 12a 1 to the stationary member, in this case the frame (not shown). A spring portion 12b (FIG. 1) of the backrest support 12 has a spring torsion leg 12b 1 (FIGS. 1, 6, 7, 10) disposed adjacent one leg of the support torsion leg 12a 1 and the second support cantilever leg 12a 3 (in this case, the second support cantilever leg 12a 3), opposed spring cantilever legs 12b 2 (FIG. 1) projecting from the spring torsion leg 12b 1, and a spring connecting leg 12b 3 for connecting the spring cantilever legs 12b 2.

A fourth clamp 16d (FIGS. 1, 6) connects the spring torsion leg 12b 1 to the second support cantilever leg 12a 3.

CLAMP 16a

The clamp 16a (FIGS. 1–3) has a body 16a 1 provided with a generally S-shaped leg-receiving cavity 16a 2 (FIGS. 2, 3) contoured to receive a generally S-shaped gripping portion 10a 1a (FIGS. 2, 3) of the support torsion leg 10a 1 with a portion of the gripping portion 10a 1a projecting (FIG. 2) above the cavity 16a 2. A cover 16a 3 (FIGS. 2, 3) of the clamp 16a is clamped down on the projecting portions of the gripping portion 10a 1a by connecting means, such as bolts 16a 4 and nuts 16a 5 (FIGS. 2, 3).

CLAMP 16b

The clamp 16b (FIGS. 4A–4C) has opposed body portions 16b 1, each provided with registering half leg-receiving cavities 16b 2 for receiving the generally U-shaped connecting portions 10a 3a, 10b 1a of the second support cantilever leg 10a 3 of the seat support portion 10a and the spring torsion leg 10b 1 of the seat spring portion 10b, respectively. Each body portion 16b 1 has a central connecting portion 16b 1a and external connecting portions 16b 1 b (FIGS. 4A, 4B) which are connected together as by, welding, or rivets 16b 3, (FIGS. 4A—4C) or nuts and bolts (not shown). Although FIG. 4C shows a clearance cavity 16b 4 between the leg-receiving side portions 16b 1, a bottom portion (not shown) may integrate the bottoms of the two side portions 16b 1.

CLAMP 16c

The clamp 16c (FIG. 5) is similar to clamp 16a (FIGS. 2, 3) and has opposed body portions 16c 1 (only one of which is shown in FIG. 5), each provided with registering generally U-shaped leg receiving cavities 16c 2 in which a gripping portion 12a 1a of the support torsion leg 12a 1 of the backrest support 12a is disposed. A central connecting portion 16c 1a and external connecting portion 16c 1b of each body portion 16c 1 are connected together by connecting means such as rivets 16c 3 or the like to secure the gripping portion 12a 1a in the leg-receiving cavities 16c 2. Bolts 16c 4 and nuts 16c 5 extend through connecting portions 16c 1a, 16 c 1 b and spacers 16c 6 and the angle 18 (not shown in FIG. 5) to secure the clamp 16c to the frame. A bottom 16c 7 is utilized.

CLAMP 16d

The clamp 16d (FIG. 6) is similar to clamps 16a (FIGS. 2, 3) and clamp 16c (FIG. 5) and has opposed body portions 16d 1 (only one of which is shown in FIG. 6), integrated by a top portion 16d 4, and provided with generally adjacent J-shaped cavities 16d 2 for receiving the generally J-shaped gripping portions 12a 3a of the second support cantilever leg 12a 3 of the backrest support 12 and adjacent generally J-shaped gripping portions 12b 1a of the spring torsion leg 12b 1 of the backrest spring portion 12b. A central connecting portion 16d 1 a and external connecting portions 16d 1b of the body portions 16d 1 are secured together by rivets 16d 3 or the like to secure the gripping portions 12a 3a and 12b 1a in the cavities 16d 2.

ALTERNATIVE EMBODIMENTS

It will be understood by those skilled in the art that alternatively as shown in FIG. 7, the clamp 16a is provided with side-mounting members 16a 4 having hinge pivot brackets 20a mounted, as by welding or the like, on the extremities of the side-mounting members 16a 4. A pivot, such as a bolt 20b and nut 20c, extends through the hinge pivot brackets 20a and a hinge body 20d so that the body 20d pivots on the bolt 20b. The body 20d and retaining member 20e are provided with registering leg-receiving cavities 20f. Connecting means, such as bolts 20b and nuts 20c, secure the body 20d to the retaining member 20e so that the support torsion leg 12a 1 of the support member 12a of the backrest member 12 is retained in the cavities 20f.

The clamp 16d (FIG. 7) is similar to clamp 16d (FIG. 6) and connects the J-shaped connecting portions 12a 1a of the support torsion leg 12a 1 of the support portion 12a of the backrest support member 12 to the J-shaped connecting portions 12b 1a of the spring torsion leg 12b 1 of the spring portion 12b of the backrest support member 12. Bolts 20b and nuts 20c connect the external connecting portions 16d 1 b of the body portion 16d 1 together.

In FIG. 8 the single J-type clamp 16e may be used to secure the adjacent J-shaped gripping portions 10a 1 a of the support torsion leg 10a 1 of the support portion 10a of the seat support member 10. This clamp 16e has the usual body portions 16e 1 provided with the registering leg-securing cavities 16e 2, secured together by rivets 16e 3 or the like extending through a central connecting portion 16e 1 a and side-connecting portions 16e 1 b. The clamp 16e has a top 16e 4. Bolts 16e 5, nuts 16e 6, spacers 16e 7 are used to secure the clamp 16e to the angle 18.

The double S-shaped clamp 16f of FIG. 9 connects the generally S-shaped gripping portion 10a 3 a (of the second support cantilever leg 10a 3 of the support portion 10a of the seat support 10) and gripping portions 10a 1 a (of the spring torsion leg 10b 1 of the spring portion 10b 1 of the seat support 10). The clamp 16f has the opposed bodies 16f 1 provided with S-shaped cavities 16f 2, and connecting portions 16f 1 a, 16f 1 b secured together as by rivets 16f 3 or the like. A bottom 16f 4 is provided for the body portions 16f 1.

In FIG. 10 the composite S-type clamp 16g has body portions 16g 1 provided with cavities 16g 2, internal connecting portions 16g 1 c, upper connecting portions 16g 1a and outer connecting portions 16g 1 b. Connecting means, such as rivets 16g 3 or the like, secure the gripping portions 12b 1a (of the spring torsion leg 12b 1 of the spring portion 12 b of the backrest member 12b ) to the gripping portions 12a 3a (of the second support cantilever leg 12 a 3 of the support portion 12a of the backrest support member 12).

SUMMARY OF THE ACHIEVEMENT OF THE OBJECTS OF THE INVENTION

It will be recognized by those skilled in the art that the objects of this invention have been achieved by providing support members, such as a seat support 10 and a backrest support 12, (FIG. 1) for a vehicle seat which maintain the high tensile strength and resistance to fatigue in the component support portion 10a 12a (FIG. 1) and spring portion 10b, 12b (FIG. 1) of each support member 10, 12 adjacent the areas of their connection, 16a , 16b, 16c, 16d prevent failure of such joints 16a, 16b, 16c, 16d and provide a thin joint silouette with no sharp or massive projections thus permitting facile application of foam material or padding about the joints 16a, 16b, 16 c, 16d.

While in accordance with the patent statutes preferred and alternative embodiments of this invention have been illustrated and described in detail, it is to be particularly understood that the invention is not limited thereto or thereby.

I claim

1. A support member for a vehicle seat having a stationary member, said support member having:
   a. a support portion having a support torsion leg, opposed support cantilever legs projecting from said support torsion leg and a second support cantilever leg connecting said support cantilever legs,
   b. one means of a first clamp means and a pivot means for securing said support torsion leg to said stationary member,
   c. a spring portion having a spring torsion leg disposed adjacent one leg of said support torsion leg and said second support cantilever leg, opposed spring cantilever legs projecting from said spring torsion leg, and a spring-connecting leg for connecting said spring cantilever legs,
   d. a second clamp means for connecting said spring torsion leg to said one leg, and
   e. said support torsion leg, said one leg, and said spring-connecting leg having a substantially rigid gripping portion,
      1. said gripping portions extending laterally from the longitudinal axes of said support torsion leg, said one leg and said spring-connecting leg to define a gripping plane so that when said one means secures said support torsion leg and said second clamp means secures said one leg, and said spring-connecting leg, said support torsion leg will not pivot with respect to said one means and said one leg and said spring-connecting leg will not pivot with respect to said second clamp means.

2. A support member for a vehicle seat having a stationary member, said support member having:
   a. a support portion having a support torsion leg, opposed support cantilever legs projecting from said support torsion leg and a second support cantilever leg connecting said support cantilever legs,
   b. a first clamp means for securing said support torsion leg to said stationary member,
   c. a spring portion having a spring torsion leg disposed adjacent one leg of said support torsion leg and said second support cantilever leg, opposed spring cantilever legs projecting from said spring torsion leg, and a spring connecting leg for connecting said spring cantilever legs,
   d. a second clamp means for connecting said spring torsion leg to said one leg, and
   e. said support torsion leg, said one leg, and said spring-connecting leg having a substantially rigid gripping portion,
      1. said gripping portions extending laterally from the longitudinal axes of said support torsion leg, said one leg and said spring-connecting leg to define a gripping plane so that when said first clamp means secures said support torsion leg and said second clamp means secures said one leg and said spring-connecting leg, said support torsion leg will not pivot with respect to said first clamp means and said one leg and said spring-connecting leg will not pivot with respect to said second clamp means.

3. A support member for a vehicle seat having a stationary member, said support member having:
   a. a support portion having a support torsion leg, opposed support cantilever legs projecting from said support torsion leg and a second support cantilever leg connecting said support cantilever legs,
   b. a pivot means for securing said support torsion leg to said stationary member,
   c. a spring portion having a spring torsion leg disposed adjacent one leg of said support torsion leg and said second support cantilever leg, opposed spring cantilever legs projecting from said spring torsion leg, and a spring-connecting leg for connecting said spring cantilever legs, and
   d. a second clamp means for connecting said spring torsion leg to said one leg.
   e. said support torsion leg, said one leg and said spring-connecting leg having a substantially rigid gripping portion,
      1. said gripping portions extending laterally from the longitudinal axes of said support torsion leg, said one leg and said spring connecting leg to define a gripping plane so that when said pivot means secures said support torsion leg and said second clamp means secures said one leg and said spring-connecting leg, said support torsion leg will not pivot with respect to said pivot means and said one leg and said spring-connecting leg will not pivot with respect to said second clamp means.

4. The support member recited in claim 2 wherein said support torsion leg has a generally S-shaped gripping portion and said first clamp means has:
   a. a body provided with a generally S-shaped receiving cavity adapted to receive said generally S-shaped gripping portion, so that a portion of said generally S-shaped gripping portion projects above said leg-receiving cavity,
   b. a cover member, and
   c. connecting means between said body and said cover member for securing said generally S-shaped portion in said leg-receiving cavity.

5. The support member recited in claim 1 wherein said one leg and said spring torsion leg each have generally U-shaped gripping portions, said generally U-shaped gripping portions being disposed adjacent each other, and said second clamp means has:
   a. opposed body portions each provided with registering generally U-shaped leg-receiving cavities for receiving said generally U-shaped gripping portions,
   b. said body portions each having registering connecting portions disposed adjacent each other, and
   c. connecting means extending through said connecting portions to secure said gripping portions in said leg-receiving cavities.

6. The support member recited in claim 2 wherein said support torsion leg has a generally U-shaped gripping portion and said first clamp means has:
   a. opposed body portions provided with registering generally U-shaped leg receiving cavities for receiving said gripping portion,
   b. said body portions having registering connecting portions disposed adjacent each other, and
   c. connecting means extending through said connecting portions to secure said gripping portion in said leg-receiving cavities.

7. The support member recited in claim 1 wherein said one leg and said spring torsion leg have generally J-shaped gripping portions, said generally J-shaped ripping portions being disposed adjacent each other, and said second clamp means has:
   a. opposed body portions provided with registering generally J-shaped leg-receiving cavities for receiving said generally J-shaped gripping portions,
   b. said body portions each having registering connecting portions disposed adjacent each other, and
   c. connecting means extending through said connecting portions to secure said gripping portions in said leg-receiving cavities.

8. The support member recited in claim 2 wherein said leg and said support torsion leg have generally J-shaped gripping portions disposed adjacent each other and said first clamp means has:
   a. opposed body portions provided with registering generally J-shaped leg receiving cavities for receiving said gripping portions,
   b. said body portions having registering connecting portions disposed adjacent each other, and c. connecting means extending through said connecting portions to secure said gripping portions in said leg-receiving cavities.

9. The support member recited in claim 1 wherein said one leg and said spring torsion leg have generally S-shaped gripping portions disposed adjacent each other, and said second clamp means has:
 a. opposed body portions provided with registering generally S-shaped leg receiving cavities for receiving said generally S-shaped gripping portions,
 b. connecting portions of said body portions being disposed adjacent each other, and
 c. connecting means extending through said connecting portions to secure said gripping portions in said leg-receiving cavities.

10. The support member recited in claim 1 wherein said one leg has a composite generally S-J-shaped gripping portion and said spring torsion leg has a generally S-shaped gripping portion, and said second clamp means has:
 a. opposed body portions provided with registering generally S-J-shaped leg-receiving cavities for receiving said gripping portions,
 b. said body portions having registering connecting portions disposed adjacent each other, and
 c. connecting means extending through said connecting portions to secure said gripping portions in said leg-receiving cavities.

11. The support member recited in claim 1 wherein said one leg is said support torsion leg.

12. The support member recited in claim 1 wherein said one leg is said second support cantilever leg.

13. The support member recited in claim 2 wherein said support torsion leg has a generally J-shaped gripping portion and said first clamp means has:
 a. opposed body portions provided with registering generally J-shaped leg-receiving cavities for receiving said gripping portion,
 b. said body portions having registering connecting portions disposed adjacent each other, and
 c. connecting means extending through said connecting portions to secure said gripping portions in said leg-receiving cavities.